Patented Oct. 5, 1937

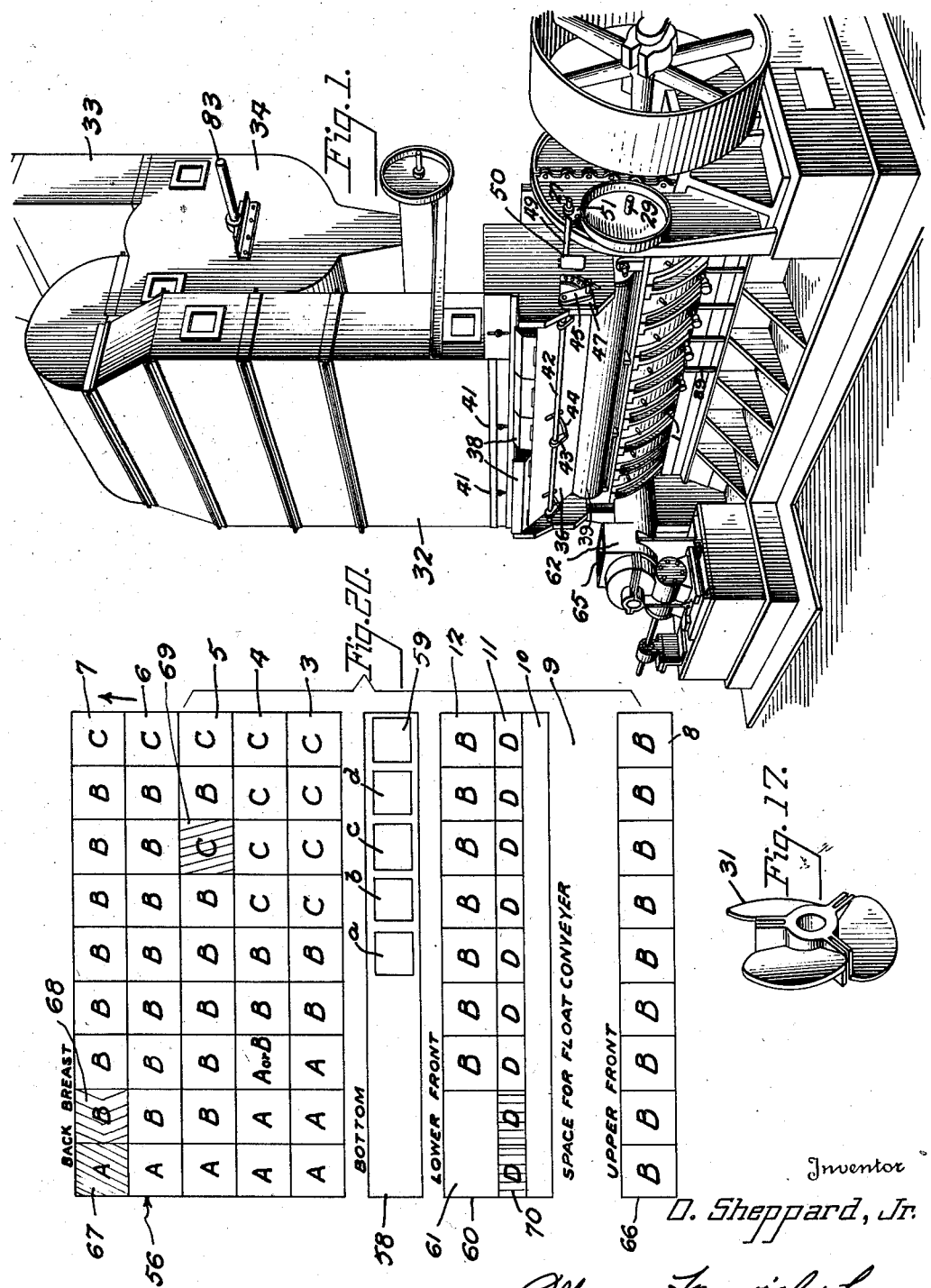

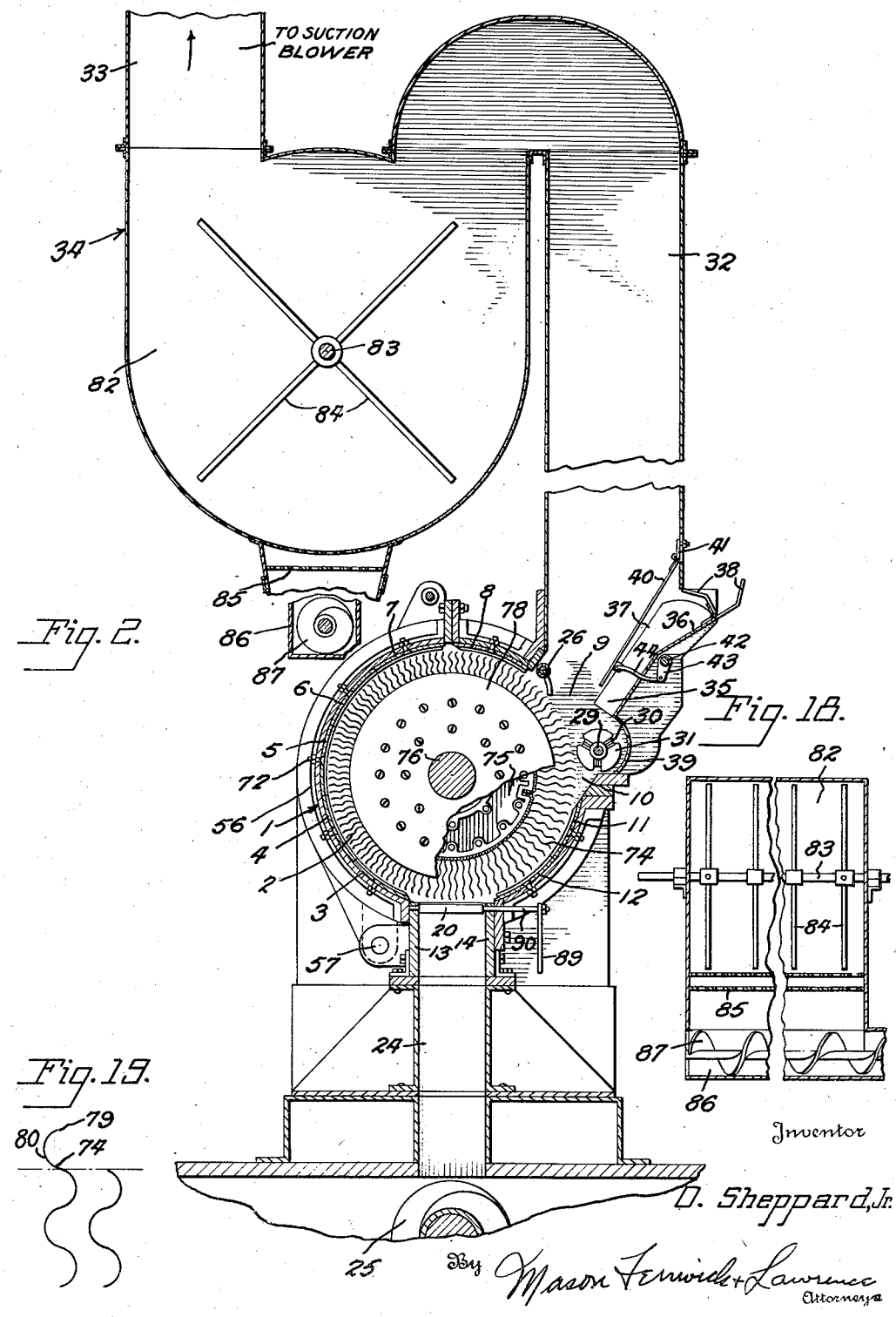

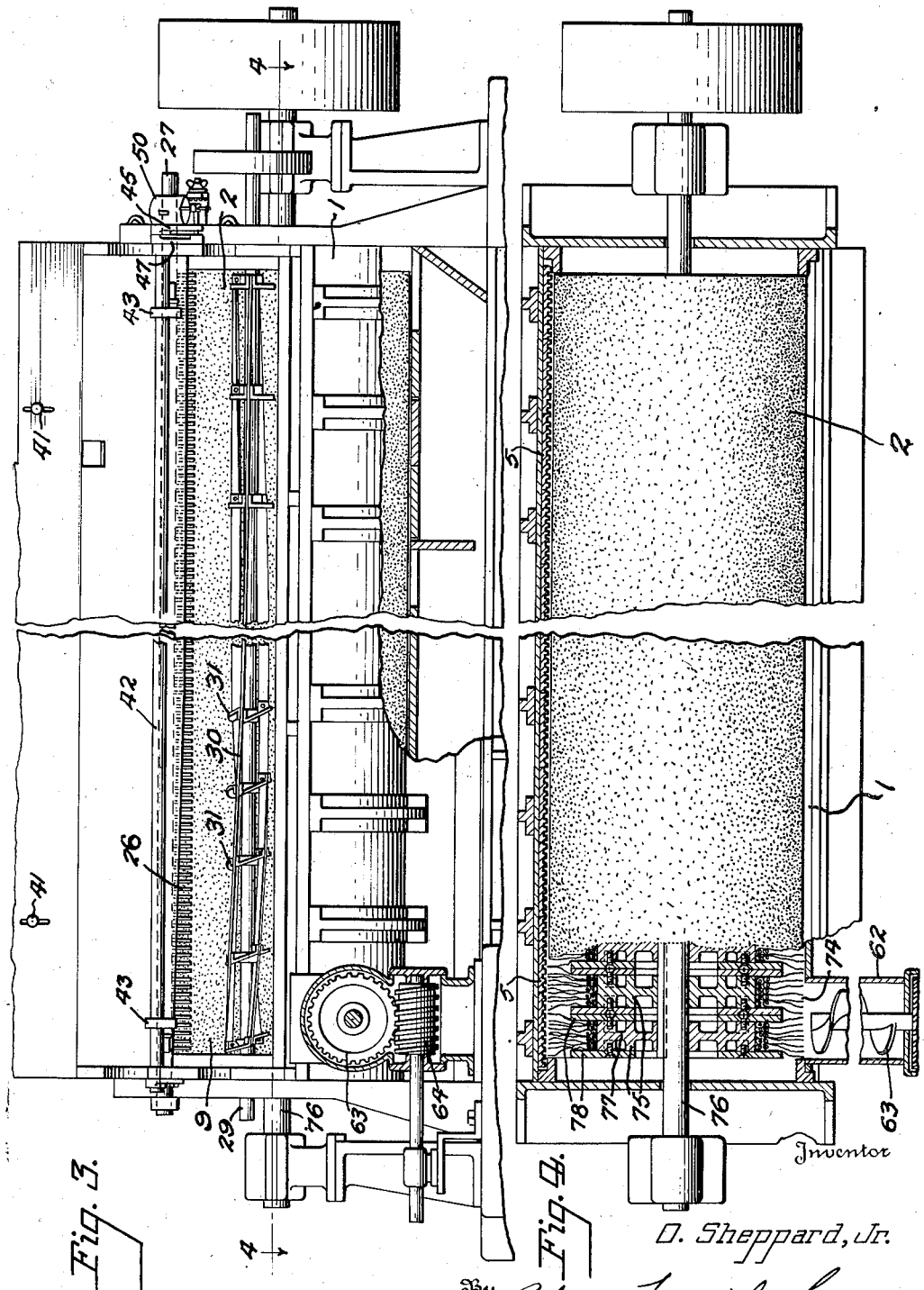

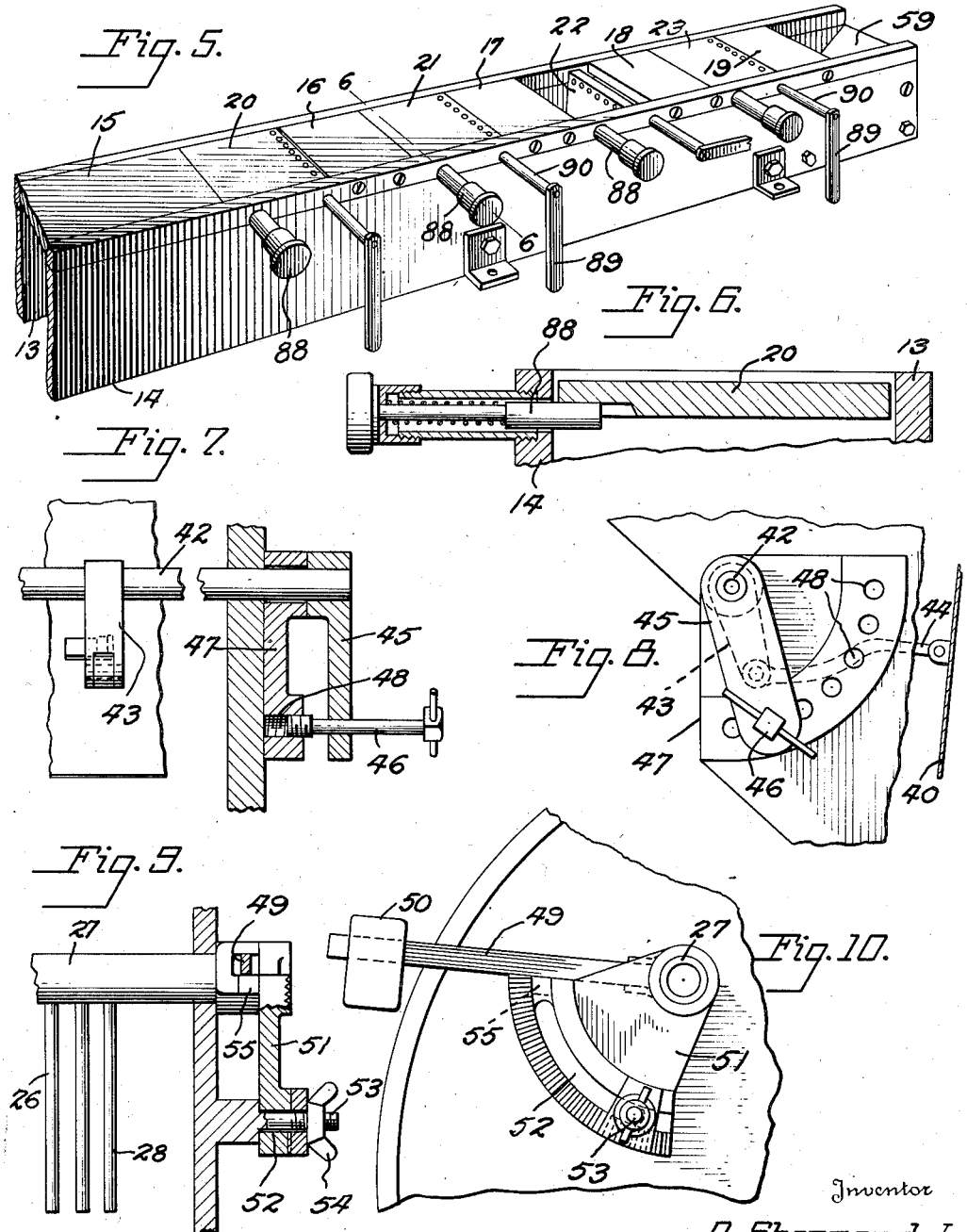

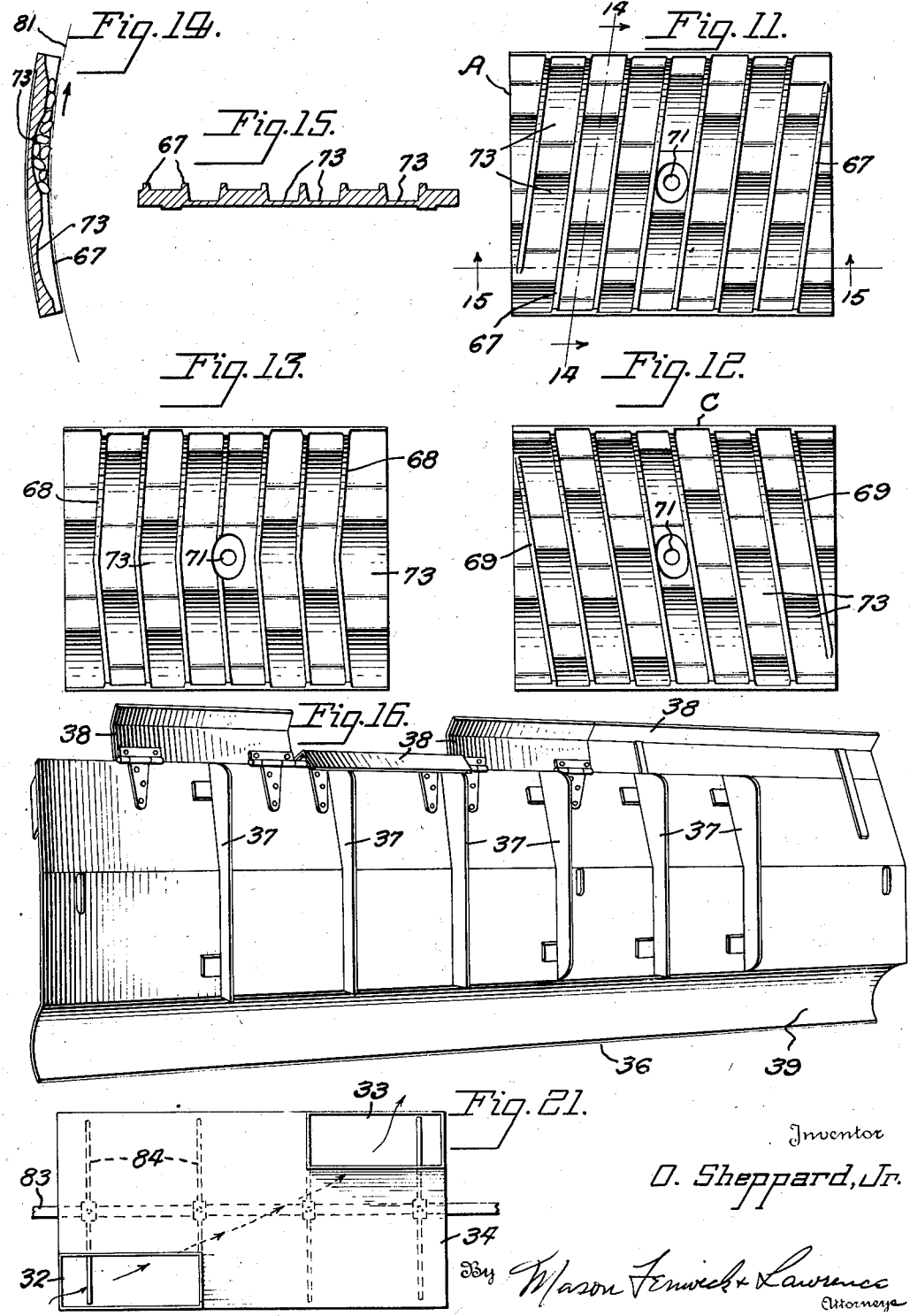

2,095,155

UNITED STATES PATENT OFFICE 2,095,155

APPARATUS FOR DELINTING COTTON

Orlando Sheppard, Jr., Atlanta, Ga.

Application November 24, 1936, Serial No. 112,575

20 Claims. (Cl. 19—41)

This invention relates to the method and apparatus for delinting cotton seeds, the fundamental principle of operation of which is to convey the seeds by means of a cylindrical driven brush in repetitive cycles in controlled manner around the inner surface of a drum from one end thereof toward the other end, the seeds being subjected to the attritive action of the brush, the surface of the drum, and seed against seed, the seed being exposed to an air blast for a brief period in each of its cyclic returns whereby the lint loosened up to that point in the treatment of the seed will be separated from the seed and carried off.

One of the objects of the invention is to provide a method of delinting cotton seed without the use of saws and in which the contaminating of the lint with "pepper" is avoided.

Another object of the invention is to provide apparatus including a drum with a brush revoluble therein, the drum being provided with grooves constituting runways for the seed, the brush acting as a conveyor for sweeping the seed through the grooves, as well as an abrasive element for brushing the lint from the seed, there being a longitudinal vent or opening in the drum and a rotary combined baffle and conveyor confronting said vent against which the seed are thrown centrifugally as they emerge into the freedom of said vent, the loosened lint being blown off by an air current at said vent while the seed striking said conveyor and baffle are moved a distance toward the discharge end of said drum before being thrown back through the vent again into the control of said brush.

Another object of the invention in a delinter of the character described is the provision of a drum, the inner surface of which is for the most part lined with removable and interchangeable plates, said plates having ribs which define the runways for the seed, some of said ribs being inclined in the opposite direction to retard the axial progress of the seed and some being without any advancing or retarding characteristics, but either zig-zag or straight according to the position where they are located and functioning solely as friction surfaces for rubbing the lint from the seed.

It will be understood that the primary and dominant advancing mechanism may be the combined baffle and conveyor which confronts the vent and that the advance or retard of the seed controlled by the direction of inclination of the ribs on the plates merely accelerates or decelerates as the case may be, the rate of progression of the seed from one end of the drum to the other and that this rate of progression may be varied at will by choosing a certain number of retard plates or a certain number of advance plates according to the requirements of the machine as learned through experience or necessitated by the characteristics of different batches of cotton seed.

A further object of the invention is the provision adjacent the advance edge of the longitudinal vent of a rake or disintegrator adjustable as to distance from the periphery of the revolving brush, the object of which is to separate or break the seed from the associated loosened lint at the moment when centrifugal force takes charge of the seed so that they are thrown out toward the combined conveyor and baffle in a curtain of seed of fan-like cross section, the seed being thus farther spaced apart, enabling the air blast to draw through them and between them, the more thoroughly loosened lint.

Still another object of the invention relates to a longitudinal air blast nozzle at the far or lower side of the vent and a suction flue covering the vent for associating the air supplied by said nozzle, the nozzle being adjustable so as to play upon a wider or narrower area of said vent and the air blast through said nozzle being controlled and variable from one end to the other of said nozzle by means of individual partitions which in effect make said nozzle a plurality of side by side nozzles and certain of which have lids by means of which the blast through that particular section or sections may, if desired, be cut off.

Another object of the invention is the provision of a plurality of discharge gates at the lower part of said drum and arranged serially in a longitudinal direction whereby seed delinted to any desired extent may at any time be taken out, it being understood that seed designed for stock feed must have considerable lint left on while seed for planting should be almost, but not quite, lintless.

Another object of the invention is to provide pits or depressions in the seed runways of the drum whereby the seeds in their cyclic progress around the drum collect in little vortices in said pits turning over and over against one another under the urge of the brush rubbing the lint from one another, this action being quite as effective and important as the attritive action of the brush or surface of the drum against said seed and minimizing the breakage of said seed resulting in cleaner lint and seed that are more certain of germination.

Still another object of the invention relates to the lint transition which comprises a beater intermediate the vent of the delinter and the suction blower with the vent flue discharging into the transition at one end of the beater while the blower flue emanates from the beater casing at the opposite end requiring the current of lint- and trash-laden air to traverse the beater longitudinally whereby it is subjected to a much larger number of beating impulses resulting in the production of cleaner lint.

A further object of the invention relates to the construction of the brush per se.

Other objects of the invention will appear as the following description of a preferred and practical embodiment thereof proceeds.

In the drawings throughout the several figures of which the same characters of reference have been employed to designate identical parts:

Figure 1 is a perspective view of apparatus embodying features of the present invention;

Figure 2 is a transverse section;

Figure 3 is a vertical longitudinal section, parts being broken away;

Figure 4 is a longitudinal horizontal section, part being broken away;

Figure 5 is a perspective view of the discharge gates and supporting members therefor;

Figure 6 is a section taken along the line 6—6 of Figure 5;

Figure 7 is a detail in section showing the adjusting detent for the blast deflector;

Figure 8 is an end view of the same;

Figure 9 is a longitudinal section showing the adjusting means for the rake or disintegrator;

Figure 10 is an end elevation of the same;

Figure 11 is a front elevation of one of the plates on which the ribs forming the seed runways are inclined in an advancing direction;

Figure 12 is a similar view showing a plate with the ribs inclined in a retarding direction;

Figure 13 is a plate showing the ribs arranged so as to direct the seed in a zig-zag path without either retarding or advancing them relative to the axial direction of the drum;

Figure 14 is a section taken along the line 14—14 of Figure 11;

Figure 15 is a section taken along the line 15—15 of Figure 11;

Figure 16 is a rear elevation of the hood forming the front part of the blast nozzle;

Figure 17 is a perspective view of one of the impellers mounted upon the combined conveyor and baffle which confronts the longitudinal vent in the drum;

Figure 18 is a sectional view showing in detail the trash conveyor leading away from the transition beneath the beater;

Figure 19 is a diagrammatic view illustrating how the undulating metallic bristles of the brush are self-resharpening through wear;

Figure 20 is a diagrammatic view representing the development of the inner cylindrical surface of the drum, the letters A, B, C, and D representing different types of detachable plates which may be selectively varied; and Figure 21 is a plan view of the top of the beater casing.

Referring now in detail to the several figures the numeral 1 represents the drum in which the brush 2 revolves. The back of the drum is lined with rows of detachable metal plates 3, 4, 5, 6, and 7. The front of the drum has an upper row of plates 8, and a longitudinal open space 9 hereinafter referred to as the vent and preferably extending from one end of the drum to the other. Below this space there is a wedge- or hopper-shaped space 10 constituting the approach to a row of half-width plates 11 below which there is a row of plates 12. In the preferred form of the invention there are no plates at the bottom of the drum. Figure 5 shows that at the bottom of the drum, there is a structure consisting of the supporting beams 13 and 14, carrying immovable floor portions 15, 16, 17, 18, and 19, alternating with discharge gates 20, 21, 22, and 23, one of which, the gate 22, is shown in open or discharge position. The gates are released by pulling out a spring retracted bolt 88 which under-laps the gates on one side. They are returned to closed position manually. An arm 89 on an extension 90 fixed to each gate indicates whether a gate is open or shut.

Figure 2 shows that the discharge gates empty through a vertical conduit 24 upon a suitable conveyor 25. The conveyor is not essential to the invention for the discharged seed from any of the gates may be made accessible in any desired manner.

At the upper side of the vent 9 is a longitudinally extending rake or disintegrator 26. As shown in Figure 9, it consists of a shaft 27 on which the teeth 28 are mounted. At the lower side of the vent 9 a longitudinal shaft 29 is mounted carrying blades or baffles 30 and impellors 31, best shown in Figure 17 for giving forward movement to the seed impinging upon and lodging against the baffles. The shaft 29 and the elements assembled therewith is designated, in view of its dual function, as a combined conveyor and baffle. A suction flue 32 preferably co-extensive in length with the vent 9 is in communication with said vent and with a suction blower, not shown, at some point beyond the upper end 33 of the transition 34. A longitudinal air blast nozzle 35 is also in communication with said vent at its inner end and with atmosphere at its outer end so that the suction blower draws an air blast in through the nozzle 35 and withdraws it through the flue 32. The change in direction of the air blast in the region of the vent 9 draws the loosened lint from the seed and carries it upward through the transition.

The nozzle 35 is composed of a fixed hood 36, see Figure 16, having partitions 37 fixed thereto dividing the nozzle into a plurality of separate air compartments. Control of air to the individual compartments of the nozzle is effected by means of hinged lids 38, any one of which or any number of which may be opened at will. Since it is desirable always to have the air blast blowing adjacent the inlet end of the drum, the first two or three air compartments are without lids, therefore being permanently open.

The hood has a lower curved portion 39 which forms an upper casing for the combined conveyor and baffle. The rear sides of the air compartments are closed by means of a swinging deflector 40. This is hinged to the inside of the flue 32 as at 41, the hinged connection being slidable so as to adjust the lower edge of the deflector closer or farther from the vent 9. The deflector 40 may be swung toward or away from the partitions 37, in effect, either increasing or decreasing the area of the mouth of the nozzle 35. The deflector is operated by an oscillatory rod 42 having cranks 43 at intervals pivotally connected to links 44 which in turn pivotally connect to the deflector 40. The rod 42 is oscillated by means best shown in Figures 7 and 8, consisting of an arm 45, carrying a detent 46. The arm oscillates above a plate 47 having an arcuate series of holes 48 in the path of the detent into any one of which holes the detent can be inserted. The detent is preferably screwable into the holes, so as surely to maintain any adjustment of the rod 42.

Reverting to the rake or disintegrator 26, its shaft 27, see Figures 9 and 10, carries an arm 49 at its end suspending a weight 50. An adjustable abutment 51 is freely mounted on the end of the shaft 27, having a slot 52 through which passes a fixed stud 53. The abutment can be oscillated through the arc of said slot and held in any position of adjustment by a wing nut 54 on the stud 53. The abutment has a shoulder 55 which sustains the weighted arm 49. The position of the shoulder 55 determines the lowermost position of the rake teeth with respect to the revolving brush. As the brush wears away the abutment may be lowered so as to lower the shoulder 55 and permit the rake teeth to come closer to the brush. Should a foreign object go through the drum and lodge behind the rake teeth, it will lift the weight 50, momentarily elevating the rake, permitting the foreign body to escape.

Figure 20 shows the arrangement of plates on the inner surface of the drum 1, the left hand side of the figure representing the anterior end of the drum to which the seeds to be treated are fed. The block 56 represents the back breast of the drum which is shown in Figure 2 as hinged at the point 57 so that it can be thrown open for inspection and particularly for the removal of the brush and plates or rearrangement of plates as conditions may require. The block 58 represents the bottom of the drum which is without plates. The rectangles a, b, c, and d represent the openings controlled by the discharge gates 20, 21, 22, and 23, in Figure 5, while the rectangle 59 is the final discharge opening which is preferably not controlled by a gate. The block 60 shows the lower front of the drum, the rectangle 61 representing the place at which the feed mechanism 62, see Figure 1, enters the drum. There are no plates at this point. As shown in Figure 3, the feed mechanism is a conveyor 63 operated through worm gearing 64. The seed to be treated are fed to the conveyor by any suitable means through the opening 65.

The block 66 represents the upper front of the drum which consists of a single row of plates. The space between the blocks 60 and 66 in Figure 20 is the vent 9 and it will be observed that the marginal portion of the block 60 which constitutes the lower edge of the vent 9 is without plates, representing the wedge or hopper-shaped space 10 referred to in connection with Figure 2.

The plates are represented in Figure 20 by the letters A, B, C, and D and it will be observed that the plates are of the same width except the row of plates D just below the hopper space 10, this row being of half-width. The plates A are formed with diagonal ribs 67 preferably spirally curved, running in a direction to advance the seed, the direction of rotation of the brush being indicated by the arrow at the right of the block 56. The plates B are provided with ribs 68 which neither advance nor retard the progress of the seed, but are preferably zig-zag so as to increase the path of contact between the seeds and the plates and brush. The plates C are provided with ribs 69 extending in a direction to retard the progress of the seed. The plates D are provided with straight ribs 70, any inclination of these ribs being avoided so as to impose no obstruction to the quick emptying of the hopper-shaped space 10.

The plates are all detachable and interchangeable, being held in position by bolts, the heads of which engage in apertures 71 in the plates and the shanks of which project through apertures in the drum to the outside thereof as indicated at 72 in Figure 2. Suitable nuts engaging the shanks of the bolts hold the plates rigidly together. The ribs of the several types of plate are spaced so as to align with the ribs of adjacent plates, making the seed runways between said ribs continuous and unbroken throughout the contiguity of the plated surface of the drum.

It has been hereinbefore stated that the combined conveyor and baffle is the primary means for advancing the seed from the anterior to the discharge end of the drum and that such advance or retardation in the progress of the seed as is produced by the inclination of the ribs on the plates of the drum is in modification of the propelling function of the combined conveyor and baffle. In the diagrammatic plate arrangement shown in Figure 20, all of the plates in the first row are arranged to advance the seed. The aggregate advance of the seed after having passed over the first row of plates is equal to the sum of the advance pitch of the ribs of a single plate. The second row of plates those designated by the character B, have no advancing function so that the total advance of seed having passed over the second row of plates is only twice the advance pitch of a single plate. The same is indicated with respect to the third row of plates although if desired a plate B can be substituted for a plate A reducing the total advance to that of a single plate. Since the fourth and fifth rows are composed altogether of plates B having no advance characteristics, no increment is imparted to the advance movement of seeds in the conveyor past these rows. In rows six and seven, the plates C are first introduced which move the seed backward so as to decelerate the normal advancing movement of the conveyor. In the final row all of the plates have a retarding characteristic so that the aggregate retardation is the sum of the retarding pitch of a single plate.

Since batches of seed vary as to the amount of lint associated therewith and with respect to the compactness of the lid, a different arrangement of plates is necessitated for optimum results.

Figures 11, 12, 13, 14, and 15 show that at intervals, the seed runways between the ribs are formed with deep pits or depressions 73. These are sufficiently deep so that a plurality of seed can gather in a group or vortex and under the influence of the sweeping movement of the brush roll over each other, under each other, laterally against one another, end over end, and against the brush and surface of the plate whereby much of the lint is loosened and detached. Where seed roll against seed, there is practically no breakage of the seed which is of the greatest importance, particularly where the delinted seed are desired for planting purpose.

The brush 2 is preferably formed of steel bristles 74 extending radially and preferably of undulating form. The brush may be manufactured in any suitable manner, but is here shown as consisting of units 75, Fig. 4, arranged in contiguous side by side relation on a power shaft 76. The units consist of a hub portion 77 having heads 78 between which are mounted in annular or spiral relation an appropriate length of fringelike metallic fabric from which the bristles emanate. The periphery of the brush presents a compact cylindrical mass of metallic bristles so densely congregated as to prevent the passage of a seed between them. The brush is preferably so mounted that it rotates with the inclined points of the bristles in a forward direction as indicated by the reference character 79 in Figure 19. When the brush is worn down to the point 80, Figure 19, it is preferred to reverse it so as once again to have the points of the bristles extend in a forward direction. Each time the bristles wear off until they no longer point forwardly, the desirability of reversing the brush is indicated.

Figure 14 shows that normally the periphery of the brush indicated by the line 81 is so close to the ribs as to leave sufficient space for only one layer of seed in the runways, the pits being an exception to this relationship. As the brush revolves, the seeds are swept upward along the back breast of the drum, being rubbed against the surface of the runway and sides of the ribs as well as being brushed by the bristles. When the seeds come to the pits 73, they collect in said pits with other seeds and form the mutual complex delinting movements above described. They are continually swept out of the pits by the rotation of the brush 2. During the course of travel of the seeds from the lower front of the drum to the upper front, the lint is loosened from the seeds, but is not dissociated therefrom so that when the seeds reach the upper end of the vent 9, they are embedded or compacted in a fluff of lint which would render the classification or separation of the seed from the lint by centrifugal force an imperfect operation. This is where the rake or disintegrator functions. As the seeds in the mass of loosened seeds strike the rake the mass is broken up and the seeds freed from the deterrent lint so that when they reach the ends of the teeth of the rake they fly out by centrifugal force toward the combined baffle and conveyor. A peculiar effect of the teeth of the rake is that instead of the seeds flying out in a single plane, they are so deflected by the rake teeth that they take different trajectories when freed from the restraint of the rake, showering upon the combined conveyor and baffle in the form of a curtain of seeds fan-shaped in cross section in a loosened formation so that the air blast blowing down through the nozzle 35 and turning and being drawn up the flue 32 readily penetrates between the seeds and removes the loosened lint therefrom. While the seeds are against the combined conveyor and baffle, they are moved forward through the action of the impellers 31, but are quickly thrown back against the brush by the baffle blades 30 being carried with the brush or dropping into the hopper-shaped space 10 and thence entering once again into the runways between the ribs of the plates. It is to be understood that each seed makes repeated revolutions on its way from the front to the rear of the drum only a little lint being loosened in each cycle. If seed only partially delinted are desired they are removed from one of the gates adjacent the anterior end of the drum. If thoroughly delinted seeds are wanted, they are permitted to traverse the drum until they reach the final discharge, or held back by arranging retarding plates so that the seed do not necessarily have to pass through entire length to thoroughly delint. If the machine is operated with a maximum load it might be necessary to permit the seed to traverse the drum until they reach the final discharge gate, but if for any reason the machine is worked with less than its maximum capacity, the plates can be arranged so that fully delinted seed may be discharged through some one of the gates further back towards the intake end of the machine. Between these two extremes, seeds with any degree of delinting may be taken out at the appropriate gates. To those skilled in the art, it will be understood that the seed being full of lint at the start fill the runways in the anterior stages of the process of delinting much more compactly than they will in the subsequent stages and that if the advancing means were uniform there would be a congestion of seeds in the anterior portion of the drum and a sparseness of production in the rest of the drum. Furthermore, there would be a non-uniform delinting of the seeds since it is more difficult to drive the air through them when they are compacted with lint than later on in the process when they are partially cleaned and spaced more individually. The means for producing variable advance of the seeds fully takes care of this problem. The seed are advanced faster near the anterior end of the drum than in the rest of the drum which assures that the seed in the initial linty stage will be quickly spread out over a greater longitudinal area of the drum permitting the air blast to get at them better. With this end in view, not only are the advancing plates near the anterior end of the drum, but the impeller disks 31 may be closer spaced on the anterior portion of the combined conveyor and baffle than elsewhere and their pitch may also be made greater.

Control of the draft is of quite as much importance as variability in the advance of the seeds and the maximum draft is generally required adjacent the anterior end of the vent where the seeds are associated with the maximum of lint. It has already been set forth that the intake of the nozzle 35 is permanently open adjacent the anterior end of the drum and that other portions of the draft inlet portions may be closed or opened at will by manipulation of the lids 38. By proper selection of plates and skillful control of the draft passages a uniform supply of seed will be treated at all points throughout the length of the drum so that it may be worked to its full capacity without impairment of its delinting efficiency.

The debris from the delinting process consisting principally of lint, but contaminated with dust and trash is drawn up through the flue 32 into the beater chamber 82. The beater consists of a driven shaft 83 with a plurality of radiating arms or paddles 84. The capacity of the beating chamber is considerably greater than that of the flue 32 so that the velocity of the lint and other debris is checked upon its entering the beater chamber and the heavier particles fall to the floor of the beater chamber passing by gravity through a screen 85 and into a conveyor trough 86 from which they are discharged by the conveyor 87. The action of the beater is to thoroughly and forcibly engage the lint in the beater chamber and dissociate it from the adherent dust or motes, the motes settling through the bottom of the beater chamber. The lint and dust is drawn upward through the flue 33 through the blower, not shown, and on the other side of the blower it is blown into a cyclone collector or condenser, not shown, which separates the dust from the cotton.

Since the present invention does not involve the use of saws or other toothed devices for separating the lint from the seed, the lint is practically free from "pepper". Pepper consists of thousands of minute specks produced by the nicking of the seed by the sharp teeth of the saws, the small size of which specks makes it impossible to remove them from the lint by mechanical means, and the presence of which makes the lint inadaptable to use in the most important lint using industries.

The efficiency of the beater is greatly increased by having the flue 32 enter at one end of the beater chamber and having the flue 33 leave the beater chamber at the opposite end. This causes the lint-laden air to traverse the beater chamber axially of the beater and to cause each particle of lint to come into engagement with a greater number of the beater arms.

While I have in the above description disclosed what I believe to be a preferred and practical embodiment of my invention, it will be understood by those skilled in the art that the details of construction as shown and described are merely by way of example and not to be construed as limiting the scope of the invention as claimed.

What I claim is:

1. Delinting apparatus comprising a drum and a revolving brush mounted co-axially therein with clearance, said drum having an opening extending substantially the length of said drum along one side, an air conduit having limbs angularly disposed at an intermediate point in said conduit, one limb being open to atmosphere, means in the other limb for drawing an air current through said conduit, said conduit at its point of angularity communicating direct with said opening substantially throughout the length of said opening whereby abrupt change of direction of said air current takes place at said opening, an intake adjacent one end of said drum for admitting raw cotton seeds with the attached lint to the space between said brush and drum, the clearance between said brush and drum being of such value as to cause said brush to sweep said seeds around said drum in frictional engagement with said brush and drum and in mutual engagement, and to throw said seeds centrifugally across said opening, whereby lint loosened by the friction is removed by the air current, and means adjacent the lower edge of said opening for advancing the seed toward the posterior end of said drum, and returning them to said drum and brush for further friction treatment at points farther toward the posterior end of said drum than the points on said drum from which they last emanated.

2. Delinting apparatus comprising a drum and a revolving brush mounted co-axially therein with clearance, said drum having an opening extending substantially the length of said drum along one side, an air conduit having limbs angularly disposed at an intermediate point in said conduit, one limb being open to atmosphere, means in the other limb for drawing an air current through said conduit, said conduit at its point of angularity communicating direct with said opening substantially throughout the length of said opening whereby abrupt change of direction of said air current takes place at said opening, an intake adjacent one end of said drum for admitting raw cotton seeds with the attached lint to the space between said brush and drum, the clearance between said brush and drum being of such value as to cause said brush to sweep the seeds around said drum in frictional engagement with said brush and drum and in mutual engagement, and to throw said seed centrifugally across said opening whereby said lint loosened by the friction is removed by the air current, means adjacent the lower edge of said opening for advancing the seed toward the posterior end of said drum and returning them to said drum and brush for further friction treatment at points farther toward the posterior end of said drum than the points on said drum from which they last emanated, the intake limb of said air conduit comprising a long flat nozzle substantially co-extensive in length with the opening in said drum and discharging adjacent the lower edge of said opening.

3. Delinting apparatus as claimed in claim 2, said nozzle comprising a hood having partitions arranged in the direction of air flow dividing said nozzle into a plurality of air passages, and a plurality of damper means for selectively opening or closing said passages.

4. Delinting apparatus as claimed in claim 2, said nozzle constituted by a fixed hood on the outside of said conduit, and an adjustable swinging deflector forming the dividing wall between the atmospheric and suction limbs of said conduit, said hood having partitions extending in the direction of air flow dividing said nozzle into a plurality of air passages and damper means for selectively opening or closing any of said air passages.

5. Delinting apparatus as claimed in claim 2, said nozzle being constituted by a fixed outer hood and a swinging deflector forming the inside wall of said nozzle, and the dividing partition between the atmospheric and suction limbs of said conduit, and means for adjusting the position of said deflector whereby the mouth of said nozzle is increased and the mouth of the suction limb of said conduit simultaneously diminished.

6. Delinting apparatus as claimed in claim 2, said nozzle being constituted by a fixed hood on the outer side and a swinging deflector forming the inner side of said nozzle and the dividing partition between the atmospheric and suction limbs of said conduit, means for adjustably varying the position of said deflector, the lower edge of said deflector being cut away on a slight slope adjacent the anterior end of said drum to increase the draft in this region of the drum.

7. Delinting apparatus comprising a drum and a revolving brush mounted co-axially therein with clearance, said drum having an opening extending substantially the length of said drum along one side, an air conduit having limbs angularly disposed at an intermediate point in said conduit, one limb being open to atmosphere, means in the other limb for drawing an air current through said conduit, said conduit at its point of angularity communicating direct with said opening substantially throughout the length of said opening whereby abrupt change of direction of said air current takes place at said opening, an intake adjacent one end of said drum for admitting cotton seeds with attached lint between said brush and drum, the clearance between said brush and drum being of such value as to cause said brush to sweep said seeds around said drum in frictional engagement with said brush and drum and in mutual engagement, and to throw said seeds centrifugally across said opening whereby lint loosened by the friction is removed by the air current, a disintegrating rake extending longitudinally of said opening adjacent the upper edge thereof for breaking the seeds out of the mat of loosened lint with which they are associated, and means adjacent the lower edge of said opening for advancing the seed toward the posterior end of said drum, and returning them to said drum and brush for further friction treatment at points farther toward the posterior end of said drum than the points on said drum from which they emanated.

8. Delinting apparatus as claimed in claim 7, the said means for advancing the seed toward the posterior end of said drum and returning them to said drum comprising a shaft, longitudinally extending blades on said shaft, means for driving said shaft in such a direction as to cause the blades in the upper phase of their rotation to approach said drum, and impellers on said shaft for advancing the seed.

9. Delinting apparatus as claimed in claim 7, the disintegrating rake comprising a shaft, extending adjacent the upper edge of said opening and beyond an end of said drum, a weighted arm on said shaft normally biasing said rake in the direction of approach to said revolving brush, and an adjustable stop for said weighted arm determining the clearance between said brush and rake, but leaving said rake free to rise against weight pressure to permit the passage of foreign bodies of greater size than normal seed.

10. Delinting apparatus for cotton seeds comprising a drum having its inner surface provided with a longitudinal succession of circumferentially arranged ribs forming between them seed runways, a cylindrical brush mounted to revolve co-axially within said drum for sweeping the cotton seeds through said runways, the interfriction between said seed and the walls of said runways, the brush, and themselves, loosening the lint, said drum being provided with a longitudinal opening, a conduit having an air current, with an intermediate part of which said opening communicates, seed returning and advancing means in the path of the trajectory of seeds thrown by centrifugal force across said opening, for returning the seed to runways subsequent to those from which the seed emanated, means for feeding seed to said drum adjacent its anterior end, and means posterior to a succession of said runways for discharging the seed.

11. Delinting apparatus for cotton seeds comprising a drum having its inner surface provided with a longitudinal succession of circumferentially arranged ribs, forming between them seed runways, a cylindrical brush mounted to revolve co-axially within said drum for sweeping the cotton seed through said runways, the interfriction between said seed and the walls of said runways, the brush, and themselves, loosening the lint, said drum being provided with a longitudinal opening, a conduit having an air current, with an intermediate part of which conduit said opening communicates, seed returning and advancing means in the path of the trajectory of seeds thrown by centrifugal force across said opening, for returning seed to runways subsequent to those from which the seed emanated, and permitting the lint to be entrained in said air current, means for feeding seed to said drum adjacent its anterior end, and a series of selective discharge ports beginning at a point posterior to a succession of said runways.

12. Delinting apparatus for cotton seeds comprising a drum having its inner surface provided with a longitudinal succession of circumferentially arranged ribs forming between them seed runways, a cylindrical brush mounted to revolve co-axially within said drum for sweeping the cotton seeds through said runways, the interfriction between said seed and the walls of said runways, the brush, and themselves, loosening the lint, said drum being provided with a longitudinal opening, a conduit having an air current, with an intermediate part of which conduit said opening communicates, seed returning and advancing means in the path of the trajectory of seeds thrown by centrifugal force across said opening, for returning the seed to runways subsequent to those from which the seed emanated, and permitting the lint to be entrained in said air current, certain of said runways adjacent the anterior portion of said drum being directed at an advancing pitch for accelerating longitudinal distribution of said seed where the lint is densest, means for feeding seed to said drum adjacent its anterior end, and means posterior to a succession of said runways for discharging the seed.

13. Delinting apparatus for cotton seeds comprising a drum having an inner surface provided with a longitudinal succession of circumferentially arranged ribs, forming between them seed runways, a cylindrical brush mounted to revolve co-axially within said drum for sweeping said cotton seeds through the runways, the interfriction between said seed and the walls of said runways, the brush, and themselves, loosening the lint, said drum being provided with a longitudinal opening, a conduit having an air current with an intermediate part of which conduit said opening communicates, seed returning and advancing means in the path of the trajectory of seeds thrown by centrifugal force across said opening for returning the seed to runways subsequent to those from which the seed emanated, and permitting the lint to be entrained in said air current, certain of said runways adjacent the anterior portion of said drum being directed with an advancing pitch for accelerating longitudinal distribution of seed where the lint is densest, certain of said runways adjacent the posterior portion of said drum being arranged with a retarding pitch for decelerating the longitudinal advance of seed so as to increase the density of their distribution, where the lint is more sparse and the air access more easy.

14. Delinting apparatus for cotton seeds comprising a drum having its inner surface provided with a longitudinal succession of circumferentially arranged ribs forming between them seed runways interspersed with pits of sufficient depth and capacity as to admit a plurality of seeds, a cylindrical brush mounted to revolve co-axially within said drum for sweeping the cotton seeds through said runways and giving them vorticular movement in said pits, the interfriction between said seed and the walls of said runways, the brush, and themselves, loosening the lint.

15. Delinting apparatus for cotton seeds comprising a drum having its inner surface provided with a longitudinal succession of circumferentially arranged ribs forming between them seed runways interspersed with pits of sufficient depth and capacity as to admit a plurality of seeds, a cylindrical brush mounted to revolve co-axially within said drum for sweeping the cotton seeds through said runways and giving them vorticular movement in said pits, the interfriction between said seed and the walls of said runways, the brush, and themselves, loosening the lint, said drum being provided with a longitudinal opening, a conduit having an air current with an intermediate part of which conduit said opening communicates, seed returning and advancing means in the path of the trajectory of seeds thrown by centrifugal force across said opening, for returning seed to runways subsequent to those from which seed emanated and permitting the lint to be entrained in said air current, means for feeding seed to said drum adjacent its anterior end, and a series of selective discharge ports beginning at a point posterior to a succession of said runways.

16. Delinting apparatus for cotton seeds comprising a drum having the inner surface provided with a longitudinal succession of circumferentially arranged ribs forming between them seed runways, said surface being constituted by a lining of interchangeable, detachable, matching plates, a cylindrical brush mounted to revolve co-axially within said drum for sweeping the cotton seeds through said runways, the interfriction between said seed and the walls of said runways, the brush, and themselves, loosening the lint, said drum being provided with a longitudinal opening, a conduit having an air current, with an intermediate part of which said conduit said opening communicates, seed returning and advancing means in the path of the trajectory of seeds thrown by centrifugal force across said opening for returning said seed to runways subsequent to those from which the seed emanated, and permitting the lint to be entrained in said air current, means for feeding seed to said drum adjacent its anterior end, and a series of selective discharge ports beginning at a point posterior to a succession of said runways.

17. Delinting apparatus for cotton seeds comprising a drum having its inner surface provided with a longitudinal succession of circumferentially arranged ribs forming between them seed runways interspersed with pits of sufficient depth and capacity as to admit a plurality of seeds, a cylindrical brush mounted to revolve co-axially within said drum for sweeping the cotton seeds through said runways and giving them vorticular movement in said pits, said surface being constituted by a lining of interchangeable, detachable, matching plates, the interfriction between said seeds, said plates, the brush, and themselves, loosening the lint.

18. Delinting apparatus for cotton seeds comprising a drum having an inner surface provided with a longitudinal succession of circumferentially arranged ribs forming between them seed runways interspersed with pits of sufficient depth and capacity to admit a plurality of seeds, a cylindrical brush mounted to revolve co-axially within said drum for sweeping said cotton seeds through said runways and giving them vorticular movement in said pits, said surface being constituted by a lining of interchangeable, detachable, matching plates, the interfriction between said plates, the brush, and themselves, loosening the lint, said drum being provided with a longitudinal opening, a conduit having an air current with an intermediate part of which conduit said opening communicates, seed returning and advancing means in the path of the trajectory of seeds thrown by centrifugal force across said opening for returning the seeds to runways subsequent to those from which the seed emanated, and permitting the lint to be entrained in said air current, certain of said runways adjacent the anterior portion of said drum being directed with an advancing pitch for accelerating longitudinal distribution of seed where the lint is densest, certain of said runways adjacent the posterior portion of said drum being arranged with a retarding pitch for decelerating the longitudinal advance of seed so as to increase the density of end distribution where the lint is more sparse and the air access more easy, the interchangeable character of said plates permitting variability as to the number and arrangement of plates having advancing or retarding characteristics, whereby to produce optimum modification of the rate of advance produced by said seed returning and advancing means.

19. In delinting apparatus having a longitudinal mouth at which seeds are repeatedly presented, and loosened lint drawn off, an air system comprising a conduit having limbs opening at said mouth and making an abrupt angle at said mouth for producing a direction change in the air current in the region of said mouth, the limb anterior to said mouth opening to atmosphere at its remote end, a suction blower in the remote end of the other limb, a beater having a plurality of longitudinally disposed beater elements rotating on a horizontal axis in a chamber forming an intermediate part of said conduit between said blower and the mouth of the delinting apparatus, the limbs of said conduit opening into said chamber at opposite ends compelling longitudinal traverse of said beater chamber by the lint- and dust-laden air current.

20. Delinting apparatus comprising a conduit including angularly disposed sections, means for producing a moving air column in said conduit subject to abrupt direction change at the adjacent ends of said sections, means for moving raw cotton seeds repetitively through a succession of circuitous paths extending transversely of said air column, and in communication therewith through an opening in said conduit in the region of said direction change, said circuitous paths being otherwise closed, the walls which define said circuitous paths, and said moving means being constructed to impart abrasive action to said seed while within said circuitous paths, for loosening lint, said moving means and said walls on the anterior side of said opening being so correlated as to throw said seed in the course of each circuit through said air column at said region of direction change for removing and carrying off loosened lint, said walls on the posterior side of said opening being so constructed and arranged as to receive and return said seed to said circuitous paths for further abrasive treatment.

ORLANDO SHEPPARD, Jr.